(12) United States Patent
Rocchi

(10) Patent No.: US 8,322,212 B2
(45) Date of Patent: Dec. 4, 2012

(54) MEMS ROTATIONAL SENSOR WITH IMPROVED ANCHORING

(75) Inventor: Alessandro Rocchi, Solvay (IT)

(73) Assignee: Maxim Integrated Products, Inc., San Jose, CA (US)

( * ) Notice: Subject to any disclaimer, the term of this patent is extended or adjusted under 35 U.S.C. 154(b) by 296 days.

(21) Appl. No.: 12/793,129

(22) Filed: Jun. 3, 2010

(65) Prior Publication Data

US 2010/0307244 A1  Dec. 9, 2010

(30) Foreign Application Priority Data

Jun. 3, 2009  (DE) .................. 20 2009 007 836 U

(51) Int. Cl.
*G01C 19/56* (2006.01)

(52) U.S. Cl. .................. 73/504.12; 73/504.04

(58) Field of Classification Search ............... 73/504.12, 73/504.13, 504.04, 504.14, 504.15, 514.29, 73/514.32, 514.36, 514.38
See application file for complete search history.

(56) References Cited

U.S. PATENT DOCUMENTS

| 5,955,668 | A  | * | 9/1999 | Hsu et al. ............... 73/504.12 |
| 6,513,380 | B2 | * | 2/2003 | Reeds et al. ............. 73/504.12 |
| 6,889,550 | B2 | * | 5/2005 | Beitia .................... 73/504.12 |
| 6,894,576 | B2 | * | 5/2005 | Giousouf et al. ........... 331/154 |
| 7,325,451 | B2 | * | 2/2008 | Blomqvist ............... 73/504.04 |
| 7,360,423 | B2 | * | 4/2008 | Ayazi et al. ............. 73/504.12 |
| 8,087,295 | B2 | * | 1/2012 | Netzer .................. 73/504.12 |

* cited by examiner

*Primary Examiner* — Helen C. Kwok
(74) *Attorney, Agent, or Firm* — North Weber & Baugh LLP

(57) ABSTRACT

A MEMS sensor is provided with a substrate and a sensor element. The sensor element moves in response to an influence registered by the sensor primarily in an oscillating turn around a sensor axis that is parallel to the substrate. The sensor has an anchor arranged on the substrate in order to hold the sensor element onto the substrate. A connecting element arranges the sensor element on the anchor.

12 Claims, 2 Drawing Sheets

MEMS ROTATIONAL SENSOR WITH IMPROVED ANCHORING

CROSS-REFERENCE TO RELATED APPLICATIONS

This application claims priority to German Application No. DE 20 2009 007 836.1 filed Jun. 3, 2009, which is hereby incorporated herein in its entirety for all purposes.

TECHNICAL FIELD

This invention refers to an MEMS sensor with a substrate and a sensor element that records a movement—relative to the substrate—as a reaction to an influence to be determined.

BACKGROUND

An MEMS sensor for registering a turning movement of the sensor is known from U.S. Pat. No. 6,573,380 B2, which is hereby incorporated herein in its entirety by this reference for all purposes. In it, MEMS stands for micro-electro-mechanical system. In a sensor built accordingly, the parts are set in an oscillating motion. When the sensor turns around a predefined axis, a sensor element intended for the MEMS sensor is deflected owing to the Coriolis force that occurs when this is done. This sensor deflection is recorded and analyzed with electric components such as capacitor plates. In the MEMS sensor of U.S. Pat. No. 6,513,380 B2, which is hereby incorporated herein in its entirety by this reference for all purposes, driving elements are used for setting an outer ring into an oscillating motion around a central anchoring point. The oscillating turning movement of the ring is around a z-axis. When the sensor is deflected around the x-axis, a Coriolis force occurs that allows the sensor element arranged in the swing to oscillate around the y-axis. This swinging movement is made possible by spring elements that fasten the sensor element to the central anchor. Capacitor plates on the underside of the sensor element and on the upper side of the substrate on which the sensor elements and the ring are arranged record the changing separation of the sensor elements from the substrate. The electric signal generated in this way can be analyzed accordingly. The sensor element is fastened to the central anchor with spring elements converging on one another to ensure that the sensor element will not participate in the turning movement of the outer ring, but allow a turning movement around the y-axis.

The disadvantage of this execution is that the manufacture of the spring elements is critical because they are relatively long and therefore a fixation of the sensor element against a turn around the z-axis cannot be 100% ensured.

The task of this invention is to create an MEMS sensor that largely ensures a fixation of the sensor element against the driving movement of the driving element but also allows a defined deflection of the sensor element around the sensor axis.

This task is solved with an MEMS sensor as described below.

BRIEF SUMMARY OF THE INVENTION

According to the invention, the spring elements with which the sensor element is fastened to the substrate have been executed to form a beam meshwork that significantly stabilizes the sensor element to prevent a turning movement around the driving axis. On the other hand, the meshwork has been executed to allow its torsion, which in turn allows a turning movement of the sensor element around the sensor axis. As a result of this, when a Coriolis force acts upon the sensor element, it can be deflected around the sensor axis. In this case, the meshwork extends along the plane of the sensor element, i.e. on the x-y plane. The torsion of the meshwork takes place around the y-axis, for example. The meshwork can also be regarded as part of the sensor element, and in this case the sensor element has openings in the anchor area that allow torsion of the sensor element in this spot. According to this description, the sensor element is partly executed as a spring element. Although described differently, it is the same invention.

The characteristic of the connecting element is influenced by the form of the meshwork beams and the corresponding arrangement and design of the holes or distances between the individual beams. Depending on the requirement made to the sensor in question, torsion of the connecting element or meshwork can already be caused with a lower force or only with a higher one.

More invention advantages can be achieved through arrangements according to the following characteristics. Owing to the invention features described therein, the characteristics of the connecting element can be influenced in accordance with the requirements made to the sensor to be manufactured. Thus, for example, by selecting the extension orientation of the individual beams (by orienting them in a parallel, converging or diverging way with respect to each other, for example, or orienting the beams mostly parallel or perpendicularly to the respective axes), the power of resistance of the sensor element van be made sufficiently large compared to the driving movement of the driving element to prevent the sensor element from moving around the driving axis, on the one hand, and on the other hand, the beams—and therefore the meshwork—can be configured so that the tilting movement of the sensor element around the sensor axis is simpler and easier. At the same time, however, care must be taken that the firmness of the connecting element around the sensor axis should be large enough so the shock movements of the sensor do not deflect its elements and therefore no signals are generated that would erroneously indicate a turning movement of the sensor.

Depending on the design of the sensor, only one single anchor could be provided for holding the sensor element. In this case, it is advantageous if two connecting elements on opposite sides of the anchor hold the sensor element together.

Another execution of the MEMS sensor would permit two anchors for holding the sensor element. In this case, it is generally enough if two connecting elements are provided, one for each anchor.

BRIEF DESCRIPTION OF THE DRAWINGS

Additional advantages of the invention are described with the help of the following execution examples, which show:

FIG. 1 shows a top view of an MEMS sensor 1 in accordance with an embodiment of the present invention. A sensor element 3 is arranged on a central anchor 2 through connecting elements 4. These connecting elements 4 are arranged on opposite sides of the anchor 2. A ring 6 surrounding the sensor element 3 has four spring elements 5. The ring 6 represents the driving element, which is set in an oscillating driving motion by driving electrodes 7 arranged on the outer periphery of the ring 6 around a z-axis that projects out of the drawing plane. The anchor 2 connects the sensor element 3 and the driving ring 6 with a substrate 8 of the sensor 1 lying underneath. If the substrate 8 makes a turning movement around the x-axis, a Coriolis force perpendicular to the driving axis z and the turning axis x is generated. As a result of this, the sensor element 3 (which, arranged on anchor 2, had so far been immobile and unrelated to the driving movement of ring 6) has tilted in an oscillatory way around the y-axis.

The tilting movement of the sensor element 3 changes the distances between the sensor element 3 and the substrate 8 lying underneath. Capacitor plates arranged between them can record the changing electrical signal generated by this. The connecting element 4 that connects the sensor element 3 with the anchor 2 is designed to be relatively stiff against a movement around the x-axis. The same applies to a tilting movement around the x-axis. The connecting element 4 has been executed so the sensor element 3 can merely turn around the y-axis. This causes torsion in the connecting element 4 that allows the sensor element 3 to deflect from the x-y plane.

Figure 1:
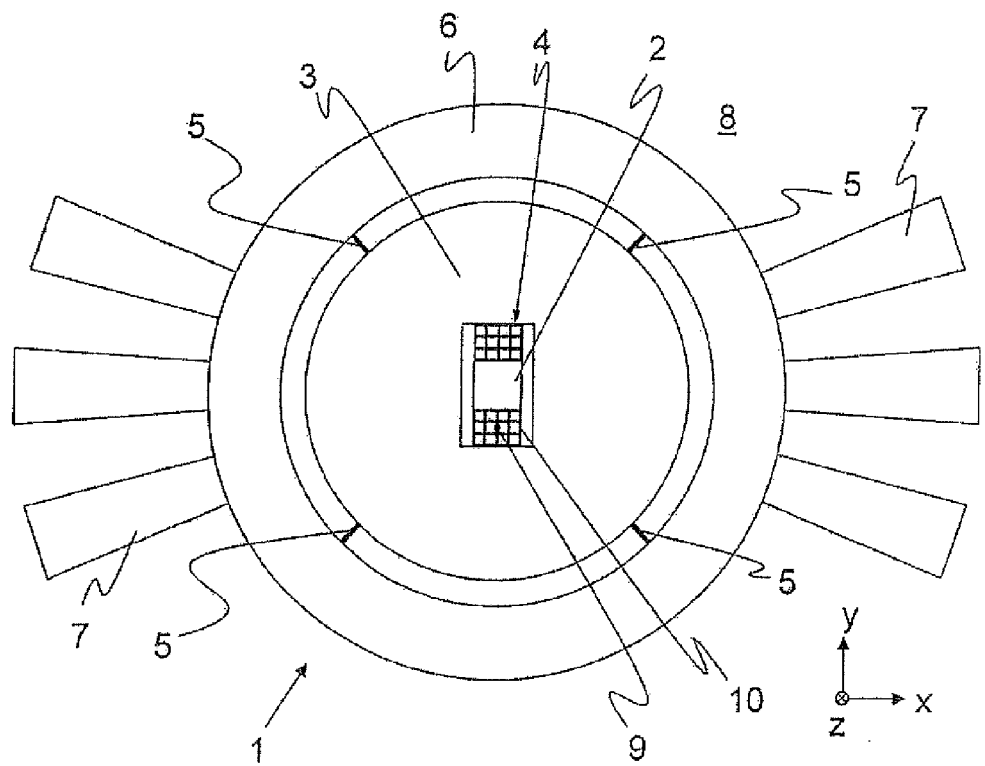
FIG. 1 An MEMS sensor with an anchor.
Figure 2:
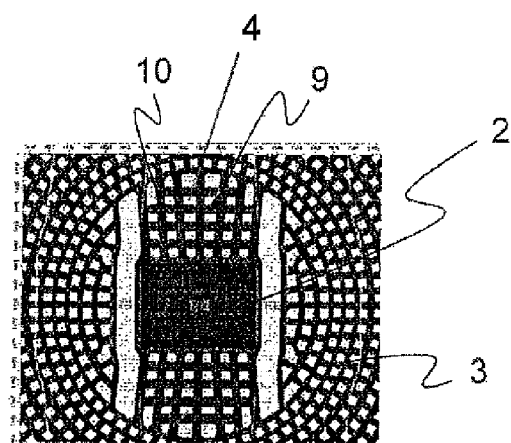
FIG. 2 Detail of a meshwork according to the invention attached to an anchor, and FIG. 3 Detail of a sensor element attached to two anchors.

FIG. 2 shows a detailed view of the connecting element 4. This connecting element 4 connects the anchor 2 with the sensor element 3. The embodiment shown in the example shows an individual anchor 2 with one connecting element 4 on each opposite side connecting the sensor element 3 with the anchor 2. The connecting element 4 is a meshwork 9 from individual beams 10 that in these embodiment examples run largely parallel or perpendicularly to each other. The meshwork 9 of the beams 10 extends mostly over the entire width of the anchor 2, hereby creating a very stable connection of the sensor element 3 with the anchor 2 with respect to forces around the x axis and z-axis. With regard to the forces acting around the y-axis, on the other hand, the meshwork 9 has been designed to allow torsion—and therefore a turn—of the sensor element 3 around the y-axis owing to the occurring Coriolis force. The design of the individual beams 10 with their distance to one another and orientation—which can be parallel, converging and/or diverging to one another—and the size of the cross-section of the individual beam 10 can greatly influence the characteristic of the connecting element 4. In the embodiment shown here as an example, the openings between the individual beams 10 near the anchor 2 are correspondingly smaller than near the sensor element 3. As a result of this, a firm connection of the sensor element 3 with the anchor 2 is ensured, and in this case, a tilting movement around the y-axis is nonetheless allowed.

Figure 3:
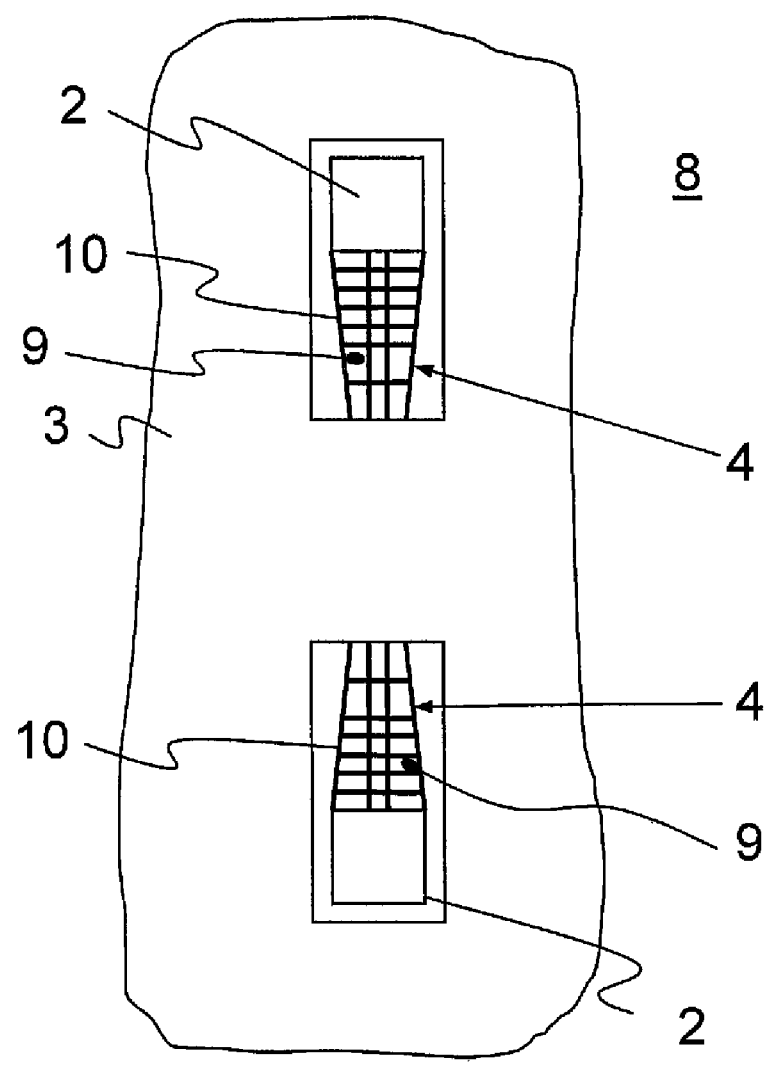

FIG. 3 shows a cutout from another exemplary embodiment of the invention. In this case, the sensor element 3 is fixed to the substrate 8 with two anchors 2 and a connecting element 4 is arranged on every anchor 2 for connecting the sensor element 3 with the anchor 2. Both connecting elements 4 of both anchors 2 are mostly aligned so that one of the degrees of freedom of the sensor element 3, for example the one around the y-axis, remains. Incidentally, the same thing also applies here, namely that owing to the design of the individual beams 10 to one another and to the cross-section of the individual beam 10, the spring characteristic can be changed, and as a result of that, the resistance of the sensor element 3 against deflections around certain turning axes can be significantly influenced.

This invention is not restricted to the exemplary embodiments shown. Within the framework of the patent claims, further invention embodiments also fall under the protective scope of this industrial property law.

REFERENCE NUMBERS LIST

1 MEMS sensor
2 Anchor
3 Sensor element
4 Connecting elements
5 Spring elements
6 Ring
7 Driving electrode
8 Substrate
9 Meshwork
10 Beams

The invention claimed is:

1. MEMS sensor, comprising:
a substrate;
a sensor element configured to move relative to the substrate as a reaction to an influence to be registered on the sensor, in which case the movement of the sensor element is primarily an oscillating turn around a sensor axis that runs largely parallel to the substrate;
at least one anchor arranged on the substrate to hold the sensor element onto the substrate; and
a connecting element is connecting the sensor element to the anchor and including a meshwork made of beams defining openings between adjacent beams.

2. MEMS sensor as in claim 1, wherein the meshwork made of beams defines a grid.

3. MEMS sensor as in claim 1, wherein the beams are primarily arranged at right angles to each other.

4. MEMS sensor as in claim 1, wherein the beams of the meshwork run at least along one of the sensor axis and an axis orthogonal to the sensor axis in the same plane as the sensor axis and are connected with the anchor and the sensor element.

5. MEMS sensor as in claim 1, wherein the beams of the meshwork run parallel to and converge towards one another at one end of the beams and diverge away from one another at the opposite end of the beams.

6. MEMS sensor as in claim 1, wherein the beams of the meshwork run at right angles to the sensor axis and extend primarily parallel to each other.

7. MEMS sensor as in claim 1, wherein the openings of the meshwork near the sensor element are larger than the openings of the meshwork near the anchor.

8. MEMS sensor as in claim 1, wherein a width of the connecting element extends at a right angle to the sensor axis mostly along an entire side of the anchor.

9. MEMS sensor as in claim 1, wherein two anchors hold the sensor element to the substrate and at least a first connecting element connects a first one of the anchors to the sensor element and at least a second connecting element connects a second one of the anchors to the sensor element.

10. MEMS sensor as in claim 1, wherein two connecting elements connect the sensor element with the anchor, a first one of the connecting elements extends outwards from a first opposite side of the anchor and a second one of the connecting elements extends outwards from a second opposite side of the anchor.

11. MEMS sensor as in claim 1, wherein the connecting element restricts the movement of the sensor element mostly to one single degree of freedom.

12. MEMS sensor, comprising:
a substrate;
a sensor element configured to move relative to the substrate as a reaction to an influence to be registered on the sensor, in which case the movement of the sensor element is primarily an oscillating turn around a sensor axis that runs largely parallel to the substrate;

at least two anchors hold the sensor element to the substrate and at least a first connecting element connects a first one of the anchors to the sensor element and at least a second connecting element connects a second one of the anchors to the sensor element, the first one of the connecting elements extends outwards from a first opposite side of the first one of the anchors and a third connecting element extends outwards from a second opposite side of the first one of the anchors; and wherein at least one of the connecting elements includes a meshwork made of beams defining openings between adjacent beams and the openings of the meshwork near the connected sensor element are larger than the openings of the meshwork near the connected anchors.

* * * * *